United States Patent [19]

Shanley, II

[11] 3,959,811
[45] May 25, 1976

[54] SET-UP ARRANGEMENT FOR A COLOR TELEVISION RECEIVER

[75] Inventor: Robert Loren Shanley, II, Indianapolis, Ind.

[73] Assignee: RCA Corporation, New York, N.Y.

[22] Filed: May 23, 1975

[21] Appl. No.: 580,685

[52] U.S. Cl. .................................. 358/10; 358/39; 358/34
[51] Int. Cl.² ..................... H04N 9/62; H04N 5/14; H04N 5/16
[58] Field of Search ......................... 358/10, 39, 34; 178/DIG. 4, DIG. 26, 7.5 DC

[56] References Cited
UNITED STATES PATENTS

| | | | |
|---|---|---|---|
| 3,249,695 | 5/1966 | Loughlin et al. | 178/7.5 |
| 3,525,801 | 8/1970 | Willis | 358/10 |
| 3,670,095 | 6/1972 | Arumugham | 358/10 |
| 3,820,155 | 6/1974 | Neal | 358/10 |

*Primary Examiner*—Benedict V. Safourek
*Assistant Examiner*—R. John Godfrey
*Attorney, Agent, or Firm*—Eugene M. Whitacre; Peter M. Emanuel

[57] ABSTRACT

A service switch is provided for a color television receiver of the type including, in the order named, a black level clamping circuit, a brightness control circuit and an amplifier for coupling luminance signals to an image reproducing kinescope. A reserve blanking circuit is coupled to the output of the amplifier for rendering the kinescope inoperative during the vertical retrace-horizontal trace intervals to inhibit the formation of disconcerting horizontal trace lines. In a "raster" position, the service switch is operative to provide a blank raster and to automatically increase the brightness of the raster to a level sufficient to permit purity adjustments. In a "service" position, the service switch is operative to disable the operation of the reserve blanking circuit and to alter the brightness control circuit to permit color temperature adjustments. The service switch controls various portions of the receiver by means of DC controls thereby minimizing noise pickup which may otherwise result if alternating control signals were utilized.

14 Claims, 8 Drawing Figures

SET-UP ARRANGEMENT FOR A COLOR TELEVISION RECEIVER

The present invention relates to color television receivers, and particularly relates to apparatus for facilitating the set-up and servicing of a color kinescope included in such receivers.

Set-up of a color kinescope entails, among a number of adjustments, color temperature and purity adjustments.

The color temperature adjustment takes into account the differences of the cathode emissions of the several electron beam producing guns of the kinescope and the differences in the efficiencies of the several phosphors of the kinescope. The color temperature adjustment typically involves adjusting direct control voltages applied between cathodes and grids of the kinescope and the AC gain of the kinescope drivers such that white information is reproduced with the proper color temperature at all brightness levels between minimum and maximum white, with the maximum white level being produced at the highest achievable level of brightness consistent with good image clarity.

The purity adjustment, as it relates to a three-color kinescope, is concerned with the degree of freedom of one color from dilution by one of the other two colors. The purity ajustment is accomplished by positioning of the electromagnetic deflection yoke and adjustment of the purity magnet assembly so as to locate the deflection center of the three electron beams to restrict each of such beams to impinge substantially upon only a single predetermined one of the three phosphors arranged on the kinescope screen.

Service switch arrangements included in color television receivers are known which provide a convenient means for factory and service personnel to make adjustments without the need for additional equipment. Typically, service switch arrangements provide "normal" and "service" or "normal", "service" and "raster" positions. When the service switch arrangement is in the "normal" position, the receiver operates to couple video signals to the kinescope for normal image viewing.

When the service switch is in the "service" position, the vertical deflection circuits are disabled and the chrominance and luminance signals are decoupled from the kinescope so that the kinescope is in its quiescent operating condition. The direct control signals coupled to the grids (or cathodes) of each gun are gradually controlled until that gun produces a barely visible narrow horizontal line on the kinescope. When all three guns have been so energized, the line will appear, from a suitable distance, as a white line of low brightness level.

In the "raster" position, the service switch operates to provide a blank raster of sufficient brightness to permit the purity and AC kinescope driver gain adjustment. The service switch may provie a blank raster, for example, by inhibiting the radio frequency or intermediate frequency amplifier portions of the receiver.

Various service switch arrangements are described in the following United States patents assigned to the same assignee as the present invention: U.S. Pat. No. 3,114,794 entitled "Color Television Receiver Control Apparatus," issued to J. Stark, Jr. et al. on Dec. 17, 1963; U.S. Pat. No. 3,114,796 entitled "Color Kinescope Set-Up Procedures for Color Television Receivers," issued to J. Stark, Jr. et al. on Dec. 17, 1963; U.S. Pat. No. 3,270,125 entitled "Color Kinescope Operating and Testing Arrangements," issued to G. E. Kelly et al. on Aug. 30, 1966; U.S. Pat. No. 3,461,225 entitled "Service Aid for Color Television Receiver," issued to P. E. Crookshanks et al. on Aug. 12, 1969; U.S. Pat. No. 3,525,801 entitled "Service Aid for Color Television Receiver," issued to D. H. Willis on Aug. 25, 1970; and U.S. Pat. No. 3,820,155 entitled "Television Receiver Service Ajustment System," issued to D. L. Neal on June 25, 1974.

Other service switch arrangements, for example, that are described in U.S. Pat. No. 3,598,905 entitled "White-Balance Servicing Circuit," issued to B. I. Keprta on Aug. 10, 1971 also are known.

When a color television receiver includes a, black level clamping circuit in the channel provided for processing luminance signals, particular problems are encountered in providing "raster" set-up arrangement. That is, black level clamping circuit serves to clamp the largest signal excursion in the black direction to a reference voltage representing black. Therefore, when the luminance signals are decoupled from the luminance processing channel during the purity adjustment to provide a blank raster, the black level clamping circuit will tend to produce a raster near black and of insufficient brightness for the purity adjustment.

An additional problem is encountered in the design of "service" set-up arrangements for color temperature ajustment of receivers of the type including a reserve (extra) blanking circuit. One such circuit, which is coupled to the kinescope for rendering it inoperative during the vertical retrace-horizontal trace interval, and thereby inhibiting the formation of disconcerting horizontal trace lines, is described in co-pending U.S. patent application Ser. No. 580,688, entitled "Gating Circuit for Providing Clamping Pulses and Extra Black Drive Capability for a Picture Tube Driver," filed by D. H. Willis on May 23, 1975. When using such an arrangement, provision should be made to insure that such "reserve blanking" does not adversely affect the set-up procedure.

Furthermore, it is desirable that the service switch control the various portions of the receiver with which it is coupled by direct (DC) control signals rather than by alternating control signals to minimize stray pickup and other problems associated with long leads coupling alternating signals.

In accordance with the present invention, a control arrangement is provided for a television signal processing system including means for receiving and amplifying television signals and for providing a composite video signal including chrominance, luminance and synchronizing signal portions, means for processing the chrominance, luminance and synchronizing signals, a color image reproducing device having plural color producing electron beam apparatus responsive to the chrominance and luminance signals, and deflection means associated with the electron beam apparatus responsive to said synchronizing signals for providing horizontal and vertical scanning of the reproducing device. The arrangement includes black level clamping means in the luminance processing channel for clamping maximum signal excursions in a predetermined direction corresponding to the black tone of an image to a reference voltage. The luminance processing channel includes brightness control means, after the black level clamping means, for controlling the DC content of the luminance signals. Switching means are coupled to the receiving and amplifying means and to the brightness control means. The switching means has a first, e.g., "normal", position for selectively rendering the receiving and amplifying means operative to supply chrominance signals to the chrominance processing channel and luminance signals to the luminance processing channel, and simultaneously, controlling the brightness control means to provide a brightness level corresponding to the normal operation of the television signal processing system. The switching means has a second, e.g., "raster", position for selectively rendering the receiving and amplifying means inoperative to supply chrominance signals to the chrominance processing channel and luminance signals to the luminance processing channel, and, simultaneously, controlling the brightness control means to provide a brightness level sufficient to permit ajustments of the receiver such as purity adjustment and adjustment of the AC gain of the image reproducer although the luminance signal is decoupled from the luminance channel.

In another aspect of the present invention, the switching means is coupled to the deflection means and also to means for coupling luminance signals, already processed by the brightness control means, to the image reproducer. The coupling provided by said coupling means is dependent on the DC content of the luminance signals. The switching means has a third, e.g., "service", position for selectively rendering the deflection means inoperative in one, e.g., the vertical, direction and, simultaneously, controlling the brightness control means to provide the luminance signals with a DC content to render the luminance signal coupling means inoperative to couple the luminance signals to the kinescope to enable color temperature adjustment.

These and other aspects of the present invention may be understood by the following detailed description in conjunction with the accompanying drawing in which.

In the following description it will be helpful to concurrently refer to FIGS. 1a and 1b which are parts of the same arrangement.

Figure 1A:
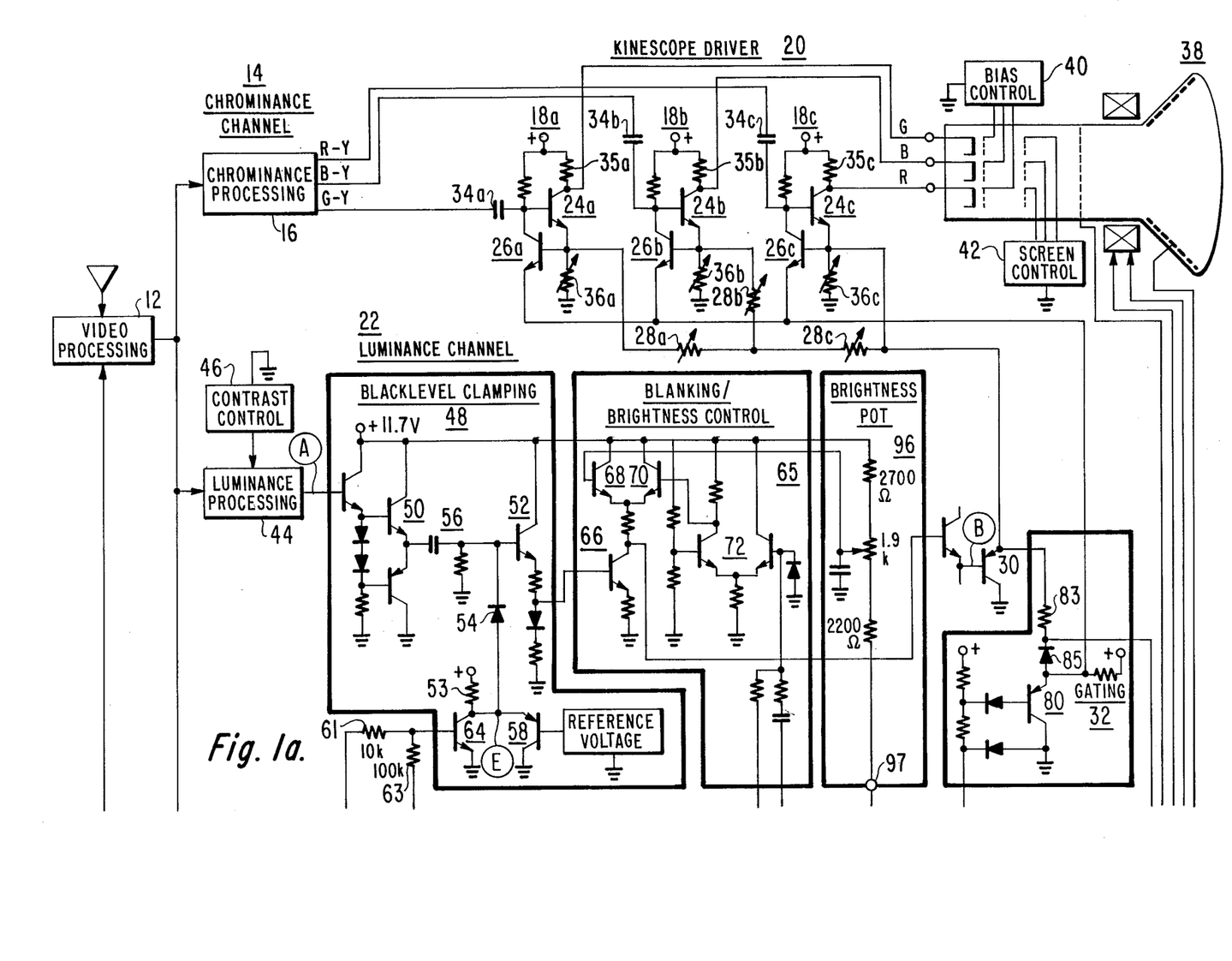
FIGS. 1a and 1b show, partially in block diagram form and partially in schematic diagram form, the general arrangement of a color television receiver employing an apparatus constructed in accordance with the present invention.
Figure 1B:
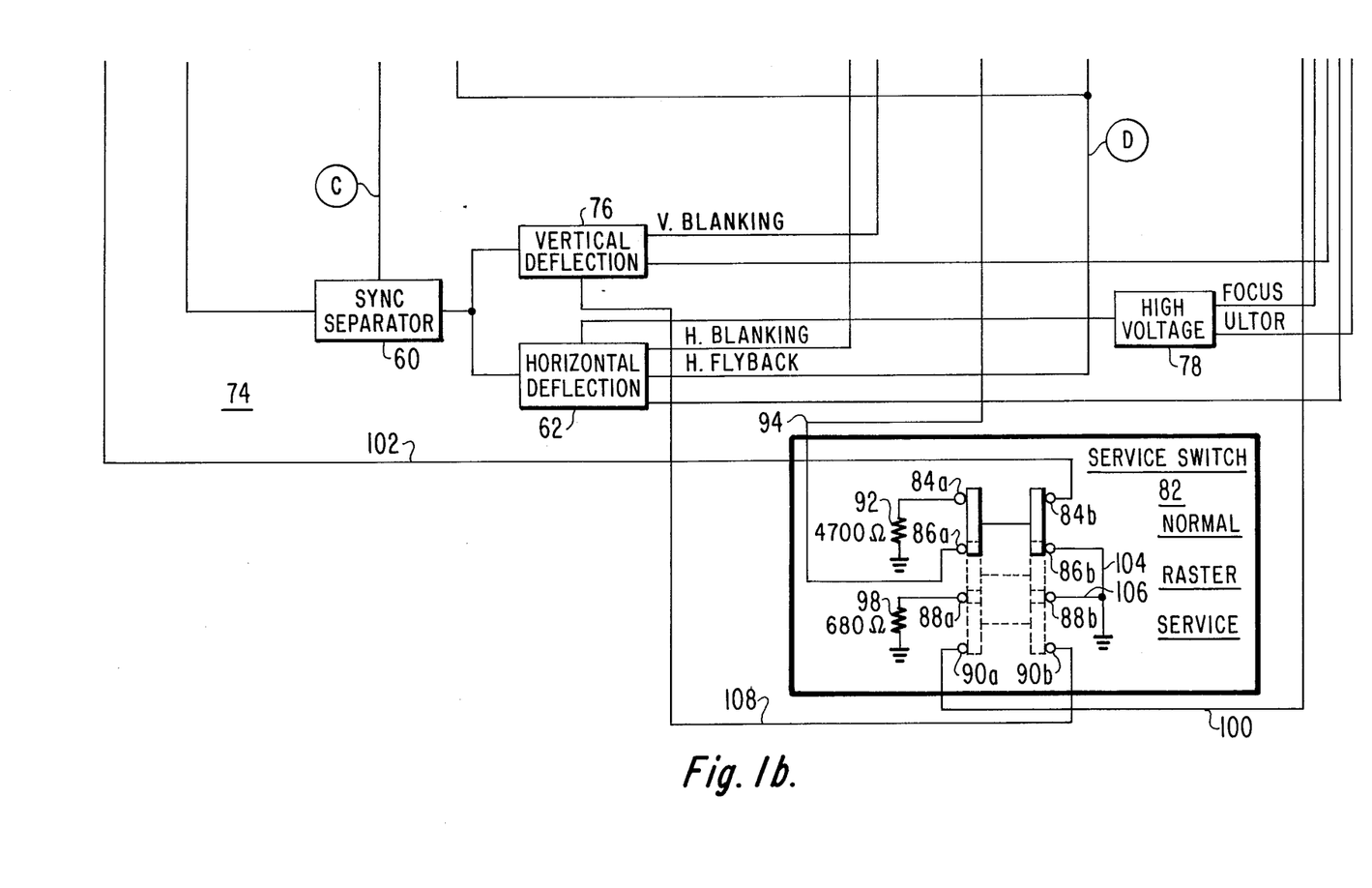

In FIGS. 1a and 1b, there is shown a color television receiver including a video processing unit 12 for receiving from an antenna radio frequency (RF) signals and for translating these signals through an intermediate frequency (IF) amplifying and detecting portion (not shown) to form a composite video signal. The composite video signal comprises chrominance, luminance, synchronization and sound signals.

A chrominance channel 14, including a chrominance processing unit 16, serves to process the chrominance signal portion of the composite video signal to form R-Y, B-Y and G-Y color difference signals.

The color difference signals are coupled to respective inputs of kinescope driver stages 18a, 18b and 18c of a kinescope driver 20. Kinescope driver stages 18a, 18b and 18c serve to matrix the output signal, -Y, of luminance channel 22 with the G-Y, R-Y and B-Y color difference signals to form respectively, G, R and B color signals.

The illustrated kinescope driver stages 18a, 18b and 18c are of the type described in U.S. patent application Ser. No. 504,357 entitled "Circuit for Maintaining Operating Point Stability of an Amplifier," filed Sept. 9, 1974 by D. H. Willis and assigned to the same assignee as the present invention. Since stages 18a, 18b and 18c are similar, the following description of stage 18a applies to stages 18b and 18c as well.

Stage 18a comprises a first NPN transistor 24a. The G-Y color difference signal is coupled through a capacitor 34a to the base of transistor 24a. The collector of transistor 24a is coupled to a source of positive supply voltage through a resistor 35a while its emitter is coupled to ground through a variable resistor 36a. The emitter of transistor 24a is also coupled through a variable resistor 28a to the emitter of a PNP transistor 30. The base of transistor 30 is coupled to the output signal of luminance channel 22.

The combination of complementary transistors 24a and 30 serves to amplify and matrix -Y and G-Y to derive the signal G at the collector of transistor 24a. Variable resistor 28a is adjustable to control the gain of the stage 18a while variable resistor 36a is adjustable to control the quiescent operating point of stage 18a. The emitter of transistor 24a is direct current coupled to the base of a second NPN transistor 26a. The collector of transistor 26a is direct current coupled to the base of transistor 24a. The emitter of NPN transistor 26a is coupled to a gating circuit 32. Capacitor 34a and NPN transistor 26a form a clamping circuit for maintaining the voltage developed at the emitter of transistor 24a substantially independent of the direct current conditions of chrominance processing unit 16 and the base-to-emitter voltage variations of transistor 24a. The clamping action occurs when transistor 26a is rendered conductive in response to a clamping pulse generated by gating circuit 32 during the horizontal flyback interval as will be explained.

The color signals R, G and B are respectively coupled to cathodes of the three electron guns of kinescope 38. Each gun, for example, comprises a cathode, a control grid and a screen grid to develop and accelerate an electron beam. A focus electrode and an ultor are also provided.

Direct bias control voltages are coupled to the control grids from a bias control unit 40 and direct screen control voltages are coupled to the screen grids from screen control unit 42 to permit adjustment of the cut off point of each gun.

Luminance channel 22 includes a luminance processing unit 44 which serves to amplify and otherwise process the luminance signal portions of the composite video signal.

A contrast control unit 46 is coupled to luminance processing unit 44 to control the amplitude of the luminance signals.

A service switch 82 is coupled to video processing unit 12, to luminance channel 12 and to a vertical deflection circuit 76 to facilitate initial adjustment of receiver operating conditions. Switch 82 is illustrated as having "normal", "raster" and "service" positions.

When service switch 82 is in its normal position, video processing unit 12 applies luminance signals to luminance processing unit 44.

The output of luminance processing unit 44 is coupled to a black level clamping circuit 48 which serves to clamp the maximum signal excursion in the direction corresponding to the black tone of an image reproduced by kinescope 38 to a reference voltage. Black level clamping circuit 48 includes a complementary emitter-follower 50, the output of which is coupled through a capacitor 56 to the input of an emitter-follower 52. A diode 54 is coupled between the output of emitter-follower 58 and is poled to charge capacitor 56 toward the maximum signal excursion in the black direction when it is rendered conductive. Charging current is provided by a current source shown as a resistor 53 coupled between a source of positive supply voltage and the anode of diode 54. A reference voltage, representing the desired black tone of an image, is coupled to the anode of diode 53 through an emitter-follower 58.

Horizontal synchronization pulses, provided by a sync separator 60, are combined with a horizontal flyback signal, provided by a horizontal deflection circuit 62, at the base of an NPN transistor 64 of black level clamping circuit 48 to control the operation of clamping circuit 48.

The output of black level clamping circuit 48 developed in the emitter circuit of transistor 52 is coupled to a blanking/brightness unit 65 which serves to control the DC component of the luminance signal. Unit 65 also serves to add vertical and horizontal blanking pulses, respectively derived by vertical deflection unit 76 and horizontal deflection unit 62, into the luminance signals such that kinescope 38 is substantially at or near cut off during the horizontal and vertical retrace intervals.

Unit 65 comprises an NPN transistor amplifier 66 including in its collector circuit the conduction paths between the respective collectors and emitters of NPN transistors 68 and 70. Amplifier 66 inverts the output signal of black level clamping circuit 48. The base of transistor 68, arranged as an emitter-follower, is coupled to the wiper arm of a brightness control potentiometer 96. The voltage developed at the wiper arm of brightness potentiometer 96 determines the DC content of the signals at the collector of amplifier 66. The base of transistor 70 is coupled to the output of differential amplifier stage 72 having an input responsive to both the vertical and horizontal blanking pulses. Transistor 70 in combination with difference stage 72 serves to insert blanking pulses into the luminance signals. The output (FIG. 2B) of unit 65, at the collector of transistor 66, is coupled through an emitter-follower stage to the base of PNP transistor 30.

Video processing unit 12 is also coupled to a channel 74 for processing synchronization signals. Sync separator 60 serves to derive the horizontal and vertical synchronization pulses from the composite video signal and to coupled such pulses to vertical deflection circuit 76 and horizontal deflection circuit 62. Deflection circuits 76 and 62 are coupled to appropriate deflection windings associated with kinescope 38. Horizontal deflection circuit 62 is also coupled to high voltage unit 78 which serves to provide supply voltages for the focus and ultor electrodes of kinescope 38.

Gating circuit 32, as previously noted, serves to generate a clamping pulse in response to the horizontal flyback signal to control the clamping operation of driver stages 18a, 18b and 18c during the horizontal retrace interval. Furthermore, the output of gating circuit 32 at the emitter of PNP transistor 80 is coupled via the series connection of a diode 85 and resistor 83 to the emitter of transistor 30 to provide an extra (reserve) blanking pulse during the vertical retrace-horizontal trace interval to insure that kinescope 38 is cut off so that disconcerting horizontal trace lines are not visible during this interval. Gating circuit 32 is described in detail in the abovereferenced U.S. patent application, Ser. No. 580,688 of D. H. Willis.

Service switch 82 serves to permit purity and color temperature adjustments of kinescope 38 by factory and service personnel without the need for additional test equipment. Service switch 86 is a three-position switch having two sets of electrically isolated poles, each set having four poles.

The first set includes poles 84a, 86a, 88a and 90a. Pole 84a is coupled through a resistor 92 to ground. Pole 86a is coupled through a conductor 94 to one end (terminal 97) of brightness potentiometer 96, the other end of which is coupled to a source of positive supply voltage. When service switch 82 is in its "normal" position, poles 84a and 86a are coupled together through a negligible impedance. Pole 88a is coupled through a resistor 98, having a relatively low value compared to that of resistor 92, to ground. When service switch 82 is in its "raster" position, poles 86a and 88a are coupled together through a negligible impedance. Pole 90a is coupled through a conductor 100 to the junction of resistor 83 and diode 85. When service switch 82 is in its "service" position, poles 88a and 90a are coupled together through a negligible impedance.

The second set of poles comprises poles 84b, 86b, 88b and 90b. Pole 84b is coupled through conductor 102 to the IF amplifier portion of video processing unit 12. Pole 86b is coupled through a conductor 104 to gorund. When serivce switch 82 is in its "normal" position, poles 84b and 86b are coupled together through a negligible impedance. Pole 88b is coupled through a conductor 106 to gound. Whether or not service switch 82 is in its "raster" position, poles 86b and 88b are coupled together through a negligible impedance. Pole 90b is coupled through a conductor 108 to vertical deflection unit 76. When service switch 82 is in its "service" position, poles 88b and 90b are coupled together through a negligible impedance.

The general arrangement shown in FIG. 1 is suitable for use in a color television receiver of the type shown, for example, in RCA Color Television Service Data, 1973, No. C-8 (a CTC-68 type receiver) published by RCA Corporation, Indianapolis, Indiana.

In operation, when service switch 82 is in its "normal" position, ground potential is applied to the IF portion of video processing unit 12 through poles 84b an 86b to provide normal signal gain conditions. Amplified luminance and chrominance signals are coupled respectively to luminance channel 22 and chrominance channel 16. Also, in the "normal" position, terminal 97 of brightness potentiometer 96 is coupled through poles 84a and 86a and resistor 92 to ground. This arrangement allows brightness potentiometer 96 to be adjusted in its normal range.

In the "raster" position of service switch 82, ground potential is removed from the IF amplified portion of video processing unit 12 since poles 84b and 86b are no longer connected together. As a result, the gain of the IF portion of video processing unit 12 is altered so as to remove luminance signals from luminance channel 22 and chrominance signals from chrominance channel 14. A blank raster is produced. Since black level clamping circuit 48 clamps the maximum signal excursions in the black direction to a reference voltage representing black, the output signal, -Y, of luminance channel 22 would, under such conditions, produce an image of insufficient brightness (i.e., substantially black) to permit purity adjustments and adjustments of the AC gain of kinescope driver stages 18a, 18b and 18c. However, in the "raster" position of service switch 82, terminal 97 of brightness potentiometer 96 is connected to ground through poles 86a and 88a and resistor 98, the latter having a relatively low value compared to resistor 92. The DC voltage at the wiper of brightness potentiometer 96 is thereby automatically decreased, decreasing the DC voltage at the emitter of transistor 68. This decrease in DC voltage is transferred without polarity change to the cathodes of kinescope 31 and thereby causes the brightness of the blank image to be shifted to a level sufficient to permit purity adjustment and adjustment of the AC gain of stages 18a, 18b and 18c.

It is desirable to select the value of resistor 98 and the supply voltage to which it is coupled (shown as ground in FIG. 1b) so that a blank raster of sufficient brightness to permit purity and kinescope driver AC gain adjustment is provided when service switch 82 is in the "raster" position independent of the setting of the wiper arm of brightness potentiometer 96 prior to the adjustment It is noted that the setting of the wiper may be changed to alter the brightness during the "raster" position.

In the "service" position of service switch 82, ground potential is applied to vertical deflection unit 76 through poles 88b and 90b. This serves to inhibit the operation of vertical deflection circuit 76 so that the image is vertically collapsed to a horizontal thin line in the center portion of the screen. Furthermore, ground potential is removed from the IF amplifier portion of video processing unit 12 to prevent chrominance or luminance information from causing perturbations in the thin horizontal line which may interfere with color temperature adjustment.

In addition, in the "service" position, conductor 94 is open circuited such that a large positive voltage, near the positive supply voltage applied to the other end of brightness potentiometer 96, is coupled through transistor 68 to the collector circuit of transistor 66. As a result, a large positive voltage is applied to the base of transistor 30 rendering it non-conductive and causing transistors 24a, 24b and 24c to provide quiescent direct voltages to respective cathodes of kinescope 38 approximately equal to that provided by a lack of luminance signal. In this condition, color temperature adjustment of kinescope 38 may be accomplished by adjusting the fixed voltages coupled to the kinescope 38 by screen control unit 42 such that when transistor 30 is cut off, the separate guns are on the threshold between condition and cut off.

It is further noted that in the "service" position, conductor 100 is coupled to ground through resistor 98. As a result, diode 85 is back-biased thereby de-coupling the extra blanking pulse generated by gating unit 32 to transistors 24a, 24b and 24c, which would otherwise upset the quiescent operating condition of transistors 24a, 24b and 24c and therefore upset the color temperature adjustment of kinescope 38.

It is noted that if extra blanking pulses were not provided, conductor 100 would not be necessary. Conductor 100 is the only AC signal coupling conductor coupled to switch 82, the remainder of the conductors coupling DC signals. Thus, noise pickup, interference signals and other problems such as capacitive loading associated with long conductors coupling AC signals to a service switch are significantly reduced by the arrangement of FIGS. 1a and 1b.

Figure 3:
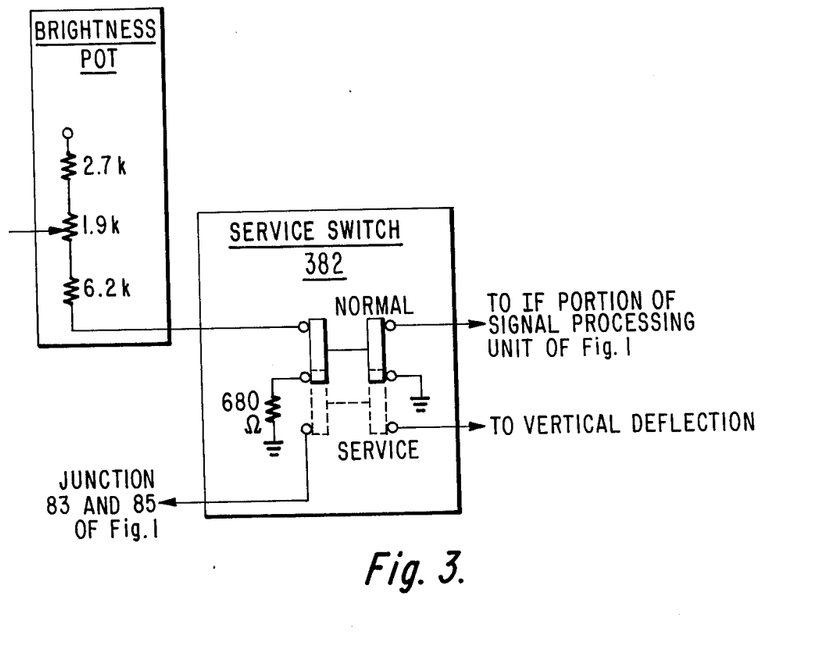
FIG. 3 shows a modification of the apparatus shown in FIGS. 1a and 1b.

It is also noted that the service switch arrangement of FIGS. 1a and 1b may be simplified if the "raster" position is omitted. Such an arrangement is shown in FIG. 3 and is similar to that shown in FIG. 1 except for the absence of the connections provided for the "raster" position.

In the particular embodiment shown, as noted above, the black level clamping circuit 48 comprises a keyed clamping circuit responsive to a signal formed by matrixing horizontal synchronization pulses with horizontal flyback signals. In this manner, only the front and back portions of the pedestal levels of the luminance signals are clamped to a reference voltage representing the black tone of an image. As a result, errors in the black level due to transient noise are reduced.

Figure 2A:
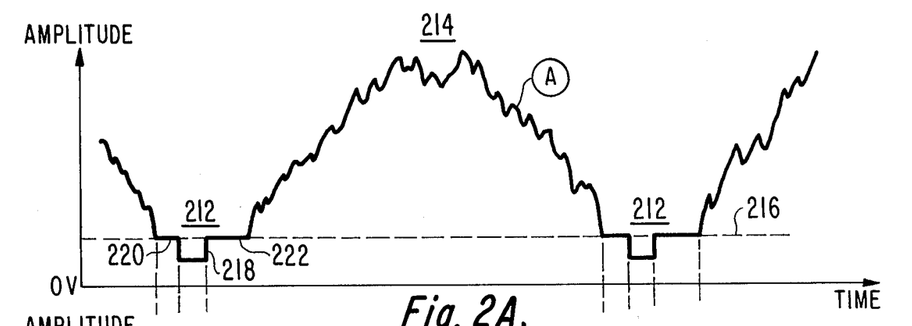
FIGS. 2a–2e show time domain waveforms useful in understanding the arrangement of FIGS. 1a and 1b.

In the operation of the black level clamping circuit 48, a waveform A of FIG. 2A will be developed at its input. Waveform A comprises image information 214 disposed between blanking pulses 212. The blanking pulses are formed by a pedestal level 216 and a synchronization pulse tip (sync tip) 218 having a time duration less than the time duration of the pedestal level, superimposed on the pedestal level so as to create a front 220 and a back 222 portion of the pedestal level.

Figures 2B, 2C:
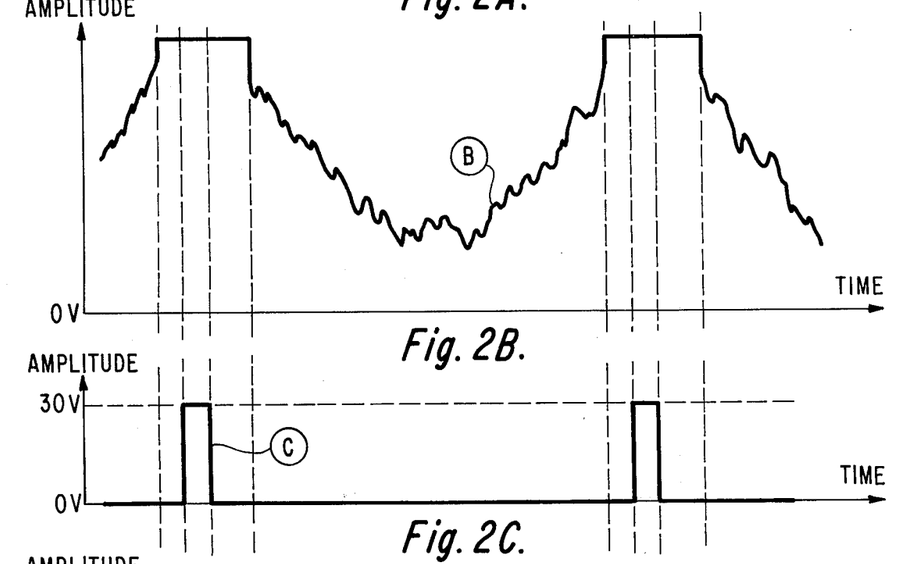
Figure 2D:
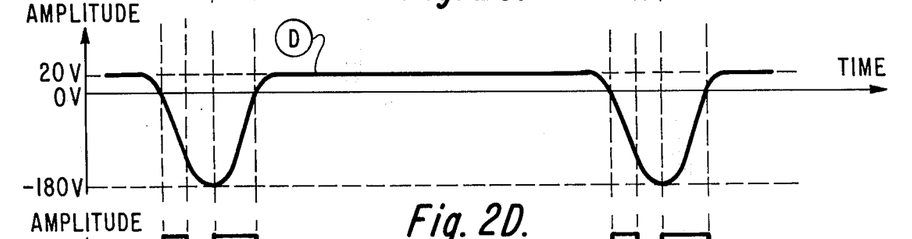

Diode 54 is only rendered conductive during the front 220 and back 222 pedestal portions of waveform A so that black level clamping circuit 48 will not clamp sync tip 218 or noise transients occurring during the image information portion 214 to the reference voltage thereby causing an incorrect black level to be established. This is accomplished by combining the horizontal synchronization pulses (waveform C of FIG. 2C), provided by sync separator 60, with the horizontal flyback signal (waveform D of FIG. 2D), provided by horizontal deflection circuit 62, at the base of NPN transistor 64 of black level clamping circuit 48. The horizontal synchronization pulses, flyback signal and sync tips are related in time as shown in FIGS. 2A, 2C and 2D.

Figure 2E:
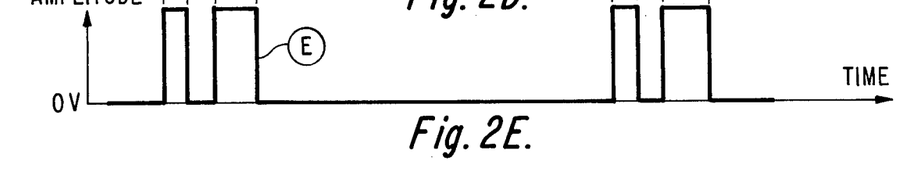

The horizontal synchronization pulses are coupled to the base of transistor 64 through resistor 61. The horizontal flyback signal is coupled to the base of transistor 64 through resistor 63. The value of resistors 61 and 63 are selected with respect to the amplitude characteristics of the respective waveforms they couple so that transistor 64 is rendered non-conductive only during the front and back pedestal portions (waveform E of FIG. 2E).

A black level clamping circuit similar to black level clamping circuit 48 shown in FIGS. 1a and 1b is described in detail in U.S. patent application Ser. No. 465,891 entitled "Black Level Clamping Circuit for a Television Signal Processor," filed on May 1, 1974 by B J. Yorkanis and assigned to the same assignee as the present invention.

Typical resistor and voltage values are shown in FIGS. 1 through 3. Although the invention has been described in terms of a specific embodiment, it is noted that various moifications may be made to these embodiments within the scope of the invention.

What is claimed is:

1. In a color television signal processing system including means for receiving and amplifying television signals and for deriving therefrom a composite video signal including chrominance, luminance and synchronizing signals, means for processing said chrominance, luminance and synchronizing signals, a color image reproducing device having plural color producing electron beam apparatus responsive to said chrominance and luminance signals, means responsive to said chrominance and luminance signals for driving said image reproducing device, and deflection means associated with said electron beam apparatus responsive to said synchronizing signals, for providing horizontal and vertical scanning of said device, control apparatus, comprising:
   black level clamping means included in said luminance processing means for clamping maximum signal excursions in the direction corresponding to the black tone of reproduced image to a reference voltage,
   brightness control means included in said luminance processing means after said clamping means for controlling the DC content of said luminance signals; and
   switching means coupled to said receiving and amplifying means and to said brightness control means and having
   a first position for selectively rendering said receiving and amplifying means operative to supply said chrominance signals to said chrominance processing means and said luminance signals to said luminance processing means and, simultaneously, controlling said brightness control means to provide a brightness level corresponding to the normal operation of said television signal processing system, and
   a second position for selectively rendering said receiving and amplifying means inoperative to supply said chrominance signals to said chrominance processing means and said luminance signals to said luminance processing means and, simultaneously, controlling said brightness control means to provide a brightness level sufficient to permit adjustment of said television signal processing system while said luminance signal is decoupled from said luminance processing channel.

2. The apparatus recited in claim 1 wherein said switching means in said second position controls said brightness control means to provide a brightness level sufficient to permit adjustment of at least one of the operating conditions of the television signal processing system including purity and the AC gain of said image reproducing device driver.

3. Apparatus according to claim 2 wherein
   said brightness control means includes a variable resistor, said second position of said switching means being arranged to provide a modified direct voltage across said variable resistor so as to increase brightness of an image produced on said image reproducing device.

4. The apparatus recited in claim 2 wherein
   means are coupled to said luminance processing means at a point following said brightness control means, for normally coupling said luminance signals to said kinescope, the coupling provided by said coupling means being determined by the DC content of said luminance signals; and wherein said switch means is coupled to said deflection means, said switching means includes a third position for selectively rendering said deflection means inoperative to provide scanning in one direction and, simultaneously, controlling said brightness control means to provide said luminance signals with a DC content to render said coupling means inoperative to couple said luminance signal to said kinescope to permit color temperature adjustment.

5. The apparatus recited in claim 4 wherein
   extra blanking means responsive to said synchronizing signals are coupled to said kinescope at a point after said coupling means for normally rendering said plural color producing beam apparatus inoperative to produce a trace image during a period in which said kinescope is being vertically retraced and horizontally traced; and wherein
   said switching means is coupled to said extra blanking means, said switching means in said third position rendering said extra blanking means inoperative.

6. The apparatus recited in claim 4 wherein
   said brightness control means includes voltage divider means coupled between a first source of fixed voltage and said switching means;
   said switching means in said first position couples said voltage divider means to a second source of fixed voltage;
   said switching means in said second position couples said voltage divider means to a third source of fixed voltage;
   said switching means in said third position couples said voltage divider means to a fourth source of fixed voltage.

7. The apparatus recited in claim 4 wherein said receiving and amplifying means is rendered inoperative to couple said chrominance signals to said chrominance processing means and said luminance signals to said luminance processing means when said switching means is in said third position.

8. The apparatus recited in claim 4 wherein said coupling means comprises:
   a first transistor of a first conductivity type, said luminance signals being coupled to the base of said first transistor, the collector of said first transistor being coupled to a first source of supply voltage; and
   a second transistor of opposite conductivity type to that of said first transistor, the emitter of said first transistor being direct current coupled to the emitter of said second transistor, the chrominance signals being coupled to the base of said second transistor, the collector being direct current coupled through an impedance to a second source of supply voltage and direct current coupled to said image reproducing device.

9. The apparatus recited in claim 5 wherein said coupling means comprises:
   a first transistor of a first conductivity type, said luminance signals being coupled to the base of said first transistor, the collector of said first trnsistor being coupled to a first source of supply voltage; and
   a second transistor of opposite conductivity type to that of said first transistor, the emitter of said first transistor being direct current coupled to the emitter of said second transistor, the chrominance signals being coupled to the base of the second transistor, the collector being direct current coupled through an impedance to a second source of supply voltage and direct current coupled to said image reproducing device; and wherein said extra blanking means is coupled to the emitter of said first transistor.

10. The apparatus recited in claim 1 wherein said luminance signals include periodic blanking pulses in the black direction, each of said blanking pulses formed by a pedestal level and a synchronization pulse tip having a time duration less than the time duration of said pedestal level, superimposed on said pedestal level, so as to leave a front and back portion of said pedestal level and signals representing image information disposed between said blanking pulses; and wherein said black level clamping means includes a keyed clamping circuit rendered inoperative to clamp maximum signal excursion in the black direction except during the front and back portions of said pedestal level.

11. In a color television signal processing system including means for receiving and amplifying television signals and for normally deriving therefrom a composite video signal including chrominance, luminance and synchronizing signals, separate channels for processing said chrominance, luminance and synchronizing signals, a color image reproducing kinescope having plural color producing electron beam apparatus responsive to said chrominance and luminance signals, means responsive to said chrominance signals and said luminance signals for driving said kinescope, and deflection means associated with said electron beam apparatus responsive to said synchronizing signals for normally providing horizontal and vertical scanning of said kinescope, control apparatus, comprising:

black level clamping means included in said luminance processing channel for clamping maximum signal excursions in the direction corresponding to the black tone of a reproduced image to a reference voltage;

brightness controlling means included in said luminance processing channel at a point after said clamping means for controlling the DC content of said luminance signals and thereby control the brightness of said image;

means coupled to said luminance processing channel at a point following said brightness control means for normally coupling said luminance signals to said kinescope, the coupling being determined by the DC content of said luminance signals; and switching means coupled to said brightness controlling means, said receiving and amplifying means and said deflection means, said switching means having a first position for selectively rendering said receiving and amplifying means and said deflection means normally operative and controlling said brightness controlling means to provide a brightness level corresponding to the normal operation of said television signal processing system;

a second position for selectively rendering said receiving and amplifying means inoperative to couple said chrominance signals to said chrominance processing channel and said luminance signals to said luminance processing channel, rendering said deflection means normally operative, and controlling said brightness controlling means to provide a brightness level sufficient to permit adjust of at least one of the operating conditions of said television signal processing system including purity and AC gain of said driver adjustments when said luminance signal is decoupled from said luminance processing channel; and a third position for selectively rendering said receiving and amplifying means inoperative to couple said chrominance signals to said chrominance processing channel and said luminance signals to said luminance processing channel, rendering said deflection means inoperative to provide scanning in the vertical direction, and controlling said brightness control means to provide said luminance signals with a DC content to render said coupling means inoperative to couple said luminance signals to said kinescope to permit color temperature adjustment.

12. In a television signal processing system of the type including signal translating means for deriving synchronizing signals and video signals, said video signals including periodic blanking pulses in the direction of signals corresponding to the black tone of an image reproduced from said video signals, each of said blanking pulses formed by a pedestal level and a synchronization pulse tip having a time duration less than the time duration of said pedestal level, superimposed on said pedestal level so as to leave a front and a back portion of said pedestal level, and signals representing image information disposed between said blanking pulses, and means for deriving from said synchronization signals horizontal synchronization pulses and horizontal flyback signals, in time relation to said synchronization pulse tips, an apparatus, comprising:

a source of said video signals coupled to a first circuit point;

means for utilizing said video signals coupled to a second circuit point;

capacitive means for capacitively coupling said video signals between said first and second circuit points;

a source of reference voltage having an output terminal;

a unidirectional coupling device direct current coupled between said output terminal and said second circuit point and poled to charge, when conducting, said capacitive means toward said pedestal level; and means coupled to said unidirectional coupling device for rendering said unidirectional coupling device nonconductive except during the front and back portions of said pedestal level.

13. The apparatus recited in claim 12 wherein the conduction of said unidirectional coupling device is controlled in response to a signal derived by combining said horizontal synchronization pulses and said flyback signals.

14. The apparatus recited in claim 13 wherein said means for rendering said unidirectional coupling device nonconductive includes a transistor, the emitter of said transistor being coupled to a source of fixed voltage, the collector of said transistor being coupled to said output terminal;

first direct current impedance means for coupling said synchronization pulses to the base of said transistor; and second direct current impedance means for coupling said flyback signals to the base of said transistor;

the value of the impedances of said first and second impedance means being respectively selected in relation to the amplitude characteristics of said horizontal synchronization pulses and said horizontal flyback pulse so that said transistor is rendered conductive except during the front and back portions of said pedestal level.

* * * * *